S. F. MYERS.
CHANGEABLE PICTURE PLATE HOLDER FOR CAMERAS.
APPLICATION FILED JUNE 12, 1919.
1,435,617.
Patented Nov. 14, 1922.
3 SHEETS—SHEET 1.
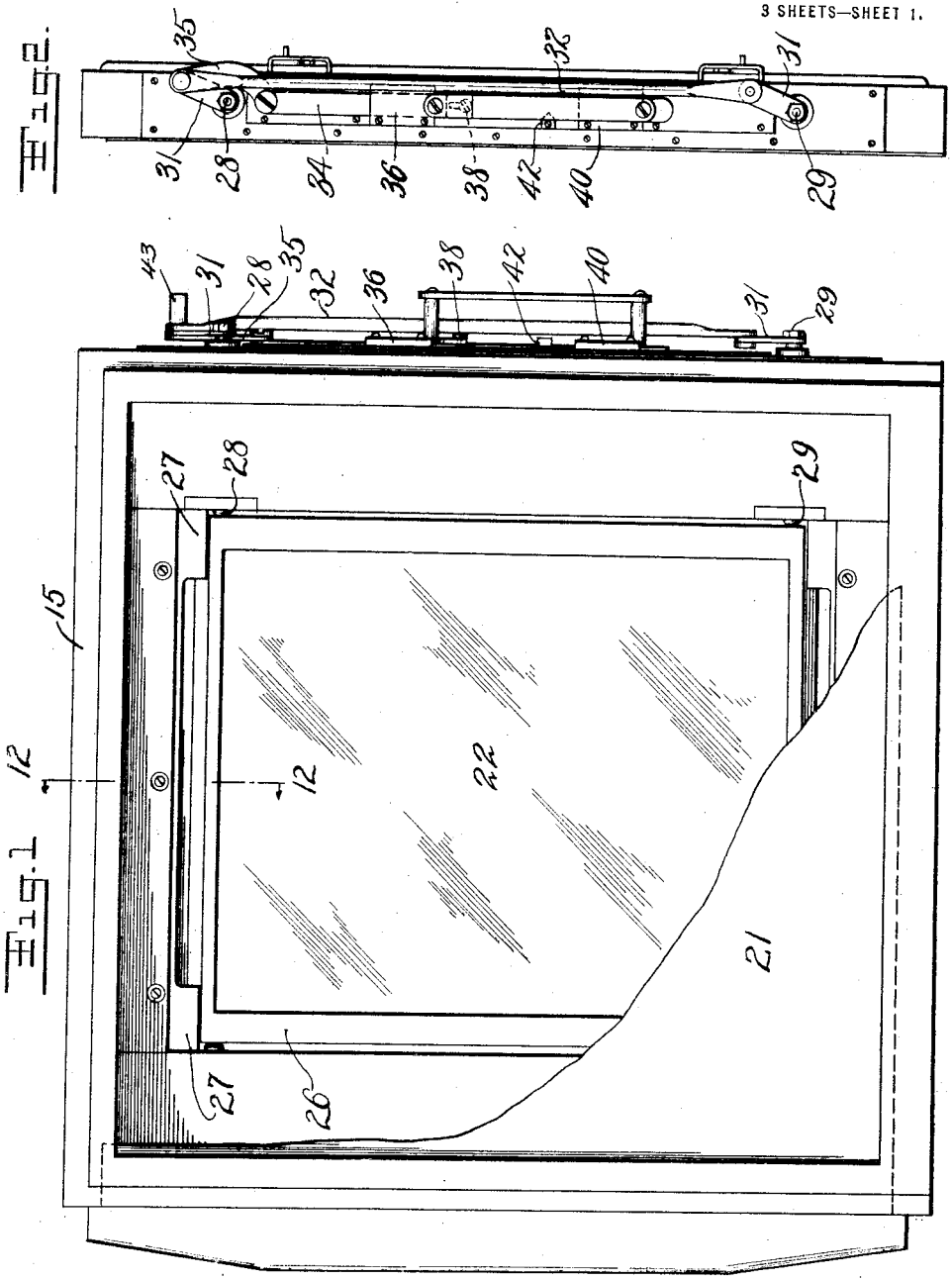

S. F. MYERS.
CHANGEABLE PICTURE PLATE HOLDER FOR CAMERAS.
APPLICATION FILED JUNE 12, 1919.
1,435,617.
Patented Nov. 14, 1922.
3 SHEETS—SHEET 2.
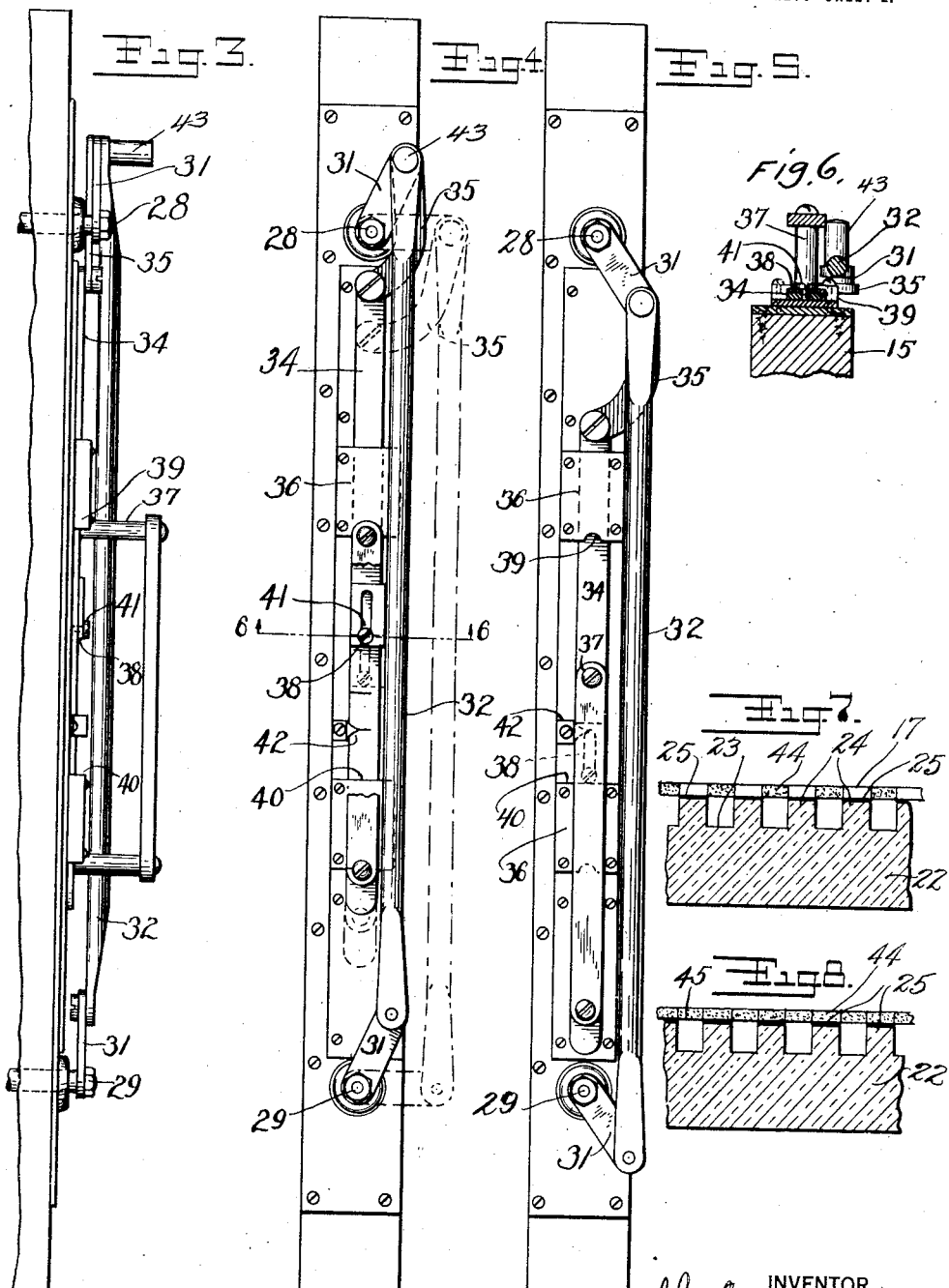

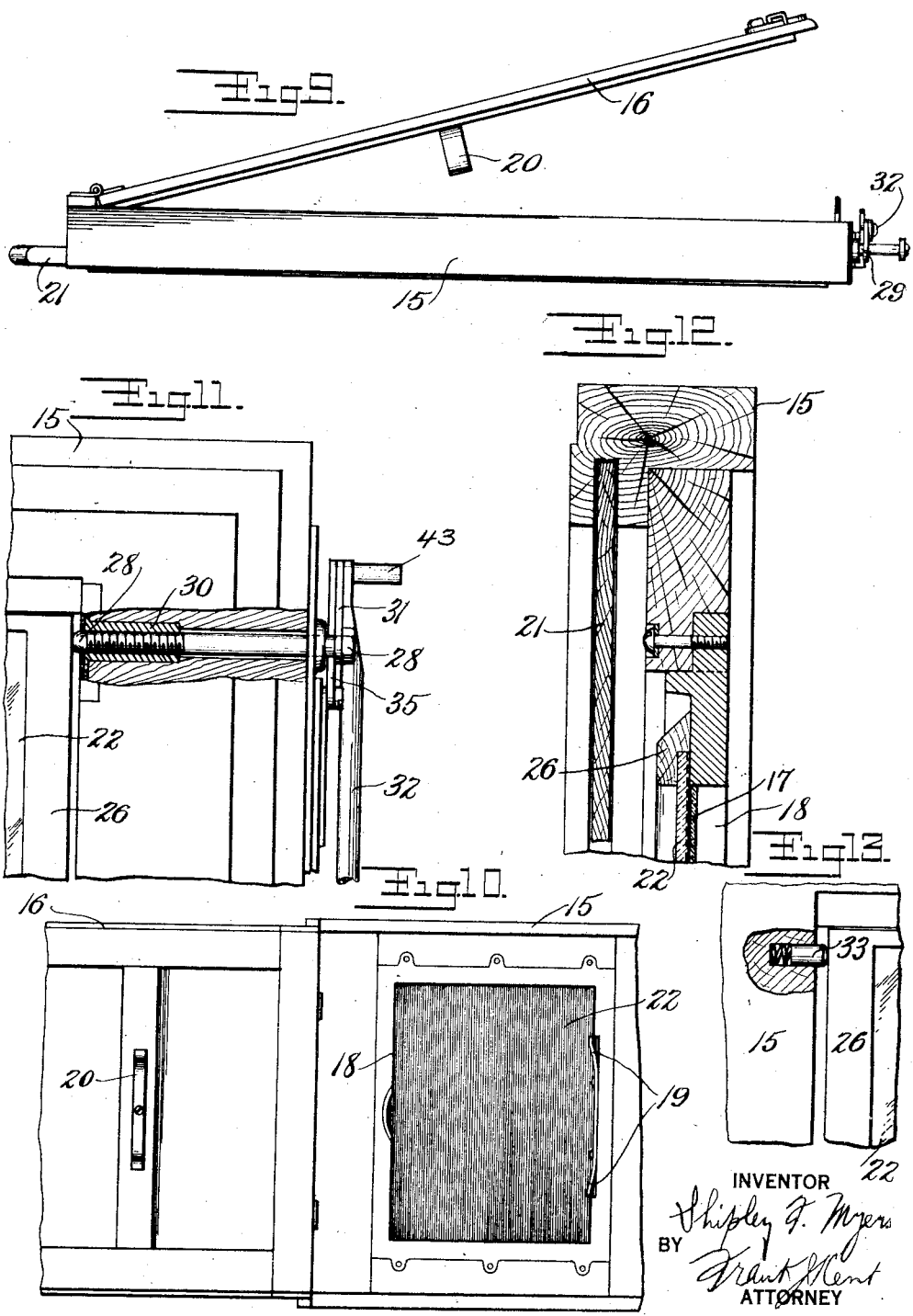

Patented Nov. 14, 1922.

1,435,617

UNITED STATES PATENT OFFICE.

SHIPLEY F. MYERS, OF NEW YORK, N. Y.

CHANGEABLE PICTURE PLATE HOLDER FOR CAMERAS.

Application filed June 12, 1919. Serial No. 303,697.

*To all whom it may concern:*

Be it known that I, SHIPLEY F. MYERS, a citizen of the United States, residing at New York, in the county of New York and State of New York, have invented certain new and useful Improvements in Changeable Picture Plate Holders for Cameras, of which the following is a specification.

This invention relates to the production of signs or pictures of the changeable or "variable reading" type, which exhibit different effects, according to the angle at which they are viewed.

The objects of the invention are to provide simple and effective apparatus for producing the multiple-image plates for such pictures or signs and to so construct the apparatus that it may be readily applied to and used in connection with an ordinary camera.

According to a preferred form, the invention is embodied in a plate holder which can be used with a camera in the usual way and consists of a lined screen shiftably mounted in the plate holder and having means by which it can be shifted, after one exposure, to cover the portions first exposed and to uncover the sensitized areas which were covered during such first exposure.

In this second position a second exposure can be made on the same plate and the two images will be separate and distinct, being confined each to a separate set of lined areas on the plate.

Various other features and details of the invention will appear as the specification proceeds.

In the accompanying drawings I have illustrated the invention embodied in a practical commercial form but would have it understood that various changes and modifications may be made without departure from the true spirit and scope of the invention, as defined in the appended claims.

Figure 1 is a front view of the device with the slide or front cover of the plate holder shown partly broken away; Figure 2 is an edge view of the right hand side thereof; Figure 3 is a broken front view; and Figures 4 and 5 are edge views of the apparatus, on an enlarged scale; Figure 6 is a detail sectional view of the shifting mechanism taken substantially on the plane of line 6—6 of Figure 4; Figures 7 and 8 are sectional views on an enlarged scale of the line screen and the sensitized medium or plate in back of the same; Figure 9 is a bottom edge view of the plate holder showing the back cover partly opened; Figure 10 is a broken rear view on a reduced scale, showing the back cover thrown all the way open to permit loading of the plate holder; Figure 11 is a broken detail view of one of the screen shifting screws and parts associated therewith; Figure 12 is a broken sectional view taken on substantially the plane of line 12—12 of Figure 1; Figure 13 is a broken detail view of one of the spring-pressed plungers for holding the screen engaged with the feed screws.

15 designates the frame or box of the device, in the nature of a plate holder and constructed usually to fit a standard plate camera. This holder is shown provided with a hinged back 16 which can be thrown open as indicated in Figures 9 and 10 to receive the sensitized medium or plate 17, which is lodged between the shoulder 18 and spring fingers 19 and held at the back by spring 20. 21 designates the front of the holder, shown as a slide, which can be withdrawn when the exposures are to be made.

The screen is indicated at 22 and the same is shown in the form of a glass plate disposed immediately in front of the sensitized medium and provided with closely spaced, narrow, vertical, alternately transparent and non-transparent lines or stripes 23 and 24. These alternate transparent and non-transparent parallel stripes are formed preferably by grooving one face of the plate, as by etching, these grooved portions being left transparent and the faces of the intervening ribs or high portions being treated to render them non-transparent or opaque, as indicated at 25 in Figures 7 and 8. This screen is shown carried in a suitable frame 26, mounted to slide laterally in guides 27, the grooved face of the screen being disposed toward the face of the sensitized plate and substantially in contact therewith (Figure 12).

The feed screws for shifting the screen are designated 28, 29, said screws engaging in stationary nut blocks 30 (Figure 11) and bearing at their inner ends on the adjacent edge of the screen frame and at points near the top and bottom of said frame. These screws are connected to operate in unison by means consisting in the present disclosure of crank arms 31, on the outer ends of the screws, connected by a link 32. The screws are of relatively fine pitch and so that an appreciable rotary movement of the screws will effect but a slight lateral movement of the screen. Also the screws are of the same pitch and operating as they do in unison, they serve to simultaneously impart equal shifting movement to both the top and bottom portions of the screen, thereby maintaining the screen in a straight path and preventing any binding tendencies. Spring-pressed plungers 33 engaging the opposite edge of the screen, hold the screen firmly engaged with the bearing points of the feed screws.

The screen is shifted usually a distance equal to the width of the lines or stripes thereon. This movement is gaged in the present disclosure by means of a slide 34, connected with one of the crank arms 31, by a link 35, so as to move proportionately with the screws, said slide working in guides 36 on the end of the main frame (Figures 3-6) and provided with stops 37, 38, for engagement with relatively stationary stop shoulders 39, 40. The cooperating stop shoulders may be made adjustable for the purpose of varying the stroke. In the illustration the stop 38 is shown as a block adjustably secured on the slide by a screw and slot connection 41. Assistance in the proper gaging of the movement is provided by a gage finger 42 overstanding the face of the slide, as indicated in Figures 4 and 5, the slide having suitable markings thereon for registering with this finger or pointer.

The feed screws may be operated by using the connecting link 32 as a reciprocating hand hold for imparting the turning movements thereto or a special hand hold 43 may be provided on the slide.

In practice the plate holder is loaded and after being placed in the camera in the usual way, the front slide 21 is withdrawn and the first exposure is made. In taking this first picture, the plate is exposed in narrow parallel stripes indicated at 44 in Figure 7, in line with the transparent stripes of the screen, the intervening stripes or lines being covered by the non-transparent portions of the screen. After covering the plate the screen is shifted laterally, by the means described, a distance equal to the width of one line, thus uncovering the non-exposed areas and covering the lined areas which have just been exposed. A second exposure is then made, with the result that the second picture is produced on the stripes or lines 45 (Figure 8) between the stripes 44, first exposed. Two distinct and separate pictures are thus produced on the same plate.

The apparatus, it will be seen, is comparatively simple and is, by reason of the fine pitch screw studs and the manner in which they are operated, particularly accurate and efficient.

I claim:—

1. In a camera attachment, a line screen, feed screws engaging said screen at separated points, a crank arm on each of said feed screws and a link connecting said crank arms.

2. In a camera attachment, a line screen, feed screws engaging said screen at separated points, a crank arm on each of said feed screws, a link connecting said crank arms, and stop mechanism limiting the movement of said feed screws.

3. In a camera attachment, a line screen, feed screws engaging said screen at separated points, a crank arm on each of said feed screws, a link connecting said crank arms, a slide connected to one of the crank arms and stops limiting the movement of said slide.

4. In a camera attachment, a line screen, feed screws engaging said screen at separated points, a crank arm on each of said feed screws, a link connecting said crank arms, a slide connected to one of the crank arms and a gage associated with said slide.

5. In a camera attachment, the combination of a line screen, feed screws operating on said screen at separated points, means for operating said feed screws in unison and means for gaging the movement of said feed screws.

6. In combination, a plate holder, a line screen laterally shiftable in said plate holder, feed screws operating on said screen at relatively widely separated points, and link mechanism connecting said screws to move them in unison.

7. In combination, a plate holder, a line screen laterally shiftable in said plate holder, feed screws operating on said screen at relatively widely separated points, link mechanism connecting said screws to move them in unison, a slide connected with said link mechanism and stops limiting the movement of said slide.

8. In combination, a plate holder, a line screen laterally shiftable in said plate holder, feed screws operating on said screen at relatively widely separated points, a crank arm on each of said feed screws, a link connecting said crank arms, a slide connected with one of the crank arms and a gage device cooperating with said slide.

9. In combination, a plate holder, a line screen laterally shiftable in said plate holder, feed screws operating on said screen at relatively widely separated points, a crank arm on each of said feed screws, a link connecting said crank arms, a slide connected with one of the crank arms and cooperating stop shoulders on said slide and on a stationary part of the plate holder.

10. A plate holder comprising a frame and a back and a front cover one of which can be opened for the loading of the holder and the other for the exposure of the plate, a laterally shiftable screen mounted in said frame in front of the position to be occupied by the plate, feed screws entered through the side of the frame engagement with the screen and means for operating said feed screws in unison.

11. A plate holder comprising a frame and a back and a front cover one of which can be opened for the loading of the holder and the other for the exposure of the plate, a laterally shiftable screen mounted in said frame in front of the position to be occupied by the plate, feed screws entered through the side of the frame into engagement with the screen, means for operating said feed screws in unison, and means for gaging the movement of the feed screws.

12. In a camera attachment a frame, a screen guided for lateral movement in said frame, spring-pressed plungers bearing on one edge of said screen for thrusting the same in one direction, feed screws bearing on the opposite edge of the screen and means for operating said feed screws in unison.

In testimony whereof I affix my signature.

SHIPLEY F. MYERS.